United States Patent
Qi et al.

(10) Patent No.: US 8,014,179 B2
(45) Date of Patent: Sep. 6, 2011

(54) MULTI OUTPUT VOLTAGE REGULATION OF A SYNCHRONOUS GENERATOR IN A POWER SYSTEM

(75) Inventors: Weiwei Qi, New Berlin, WI (US); Mahesh J. Shah, Lindenhurst, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 483 days.

(21) Appl. No.: 12/128,647

(22) Filed: May 29, 2008

(65) Prior Publication Data
US 2009/0296439 A1 Dec. 3, 2009

(51) Int. Cl.
*H02M 5/45* (2006.01)
(52) U.S. Cl. .................. 363/37; 363/72; 322/10
(58) Field of Classification Search .......... 322/10, 322/15, 16, 29, 23, 28; 290/46, 52, 36, 38, 290/40 A–40 F, 44; 318/136, 400.02, 400.05, 318/400.09, 400.11, 705; 363/36–41, 98, 363/132, 71–74; 307/64, 66, 19, 65, 82, 307/29, 48, 86
See application file for complete search history.

(56) References Cited

U.S. PATENT DOCUMENTS

| | | | |
|---|---|---|---|
| 4,103,217 A | | 7/1978 | Auinger et al. |
| 4,947,100 A | * | 8/1990 | Dhyanchand et al. .......... 322/10 |
| 5,157,319 A | * | 10/1992 | Klontz et al. ................. 320/108 |
| 5,311,419 A | * | 5/1994 | Shires .............................. 363/65 |
| 5,554,923 A | * | 9/1996 | Maddali et al. ................. 322/25 |
| 6,144,190 A | * | 11/2000 | Scott et al. ...................... 322/25 |
| 6,423,950 B2 | * | 7/2002 | Moro ............................ 219/501 |

OTHER PUBLICATIONS

Korean Patent Office: Master's Thesis of Chungnam National University—The Development of the 3k W full Bridge Zero-Voltage-Switched PWM converter, Feb. 1996.

* cited by examiner

*Primary Examiner* — Rajnikant Patel
(74) *Attorney, Agent, or Firm* — Carlson, Gaskey & Olds, PC

(57) ABSTRACT

In typical commercial/aerospace applications, synchronous generators provide power to both the high voltage and the low voltage loads. This disclosure describes a method of regulating the output voltage for all of the loads.

17 Claims, 2 Drawing Sheets

MULTI OUTPUT VOLTAGE REGULATION OF A SYNCHRONOUS GENERATOR IN A POWER SYSTEM

BACKGROUND OF THE INVENTION

Voltage regulation for a synchronous generator includes a voltage regulator for both a high voltage supply and a low voltage supply.

In modern electrical systems, there are various types of loads that require different voltages. These voltages are preferably more or less constant over wide load variations.

In the prior art, different methods of voltage regulation have been identified for a given type of voltage. This is true for both 3-phase AC voltage and a rectified DC voltage.

In the prior art, standard conventional DC/DC converter for the high voltage to low voltage conversion are used. This requires a transformation ratio of 20:1 or higher, and results in large expensive components and a very narrow range of voltage regulation. As a consequence, it is difficult to maintain output voltage constant with desired dynamic response.

The prior art voltage regulation could be characterized as providing adequate voltage control over either a high voltage supply or a low voltage supply. However, the prior art has been deficient in providing adequate control over both.

SUMMARY OF THE INVENTION

In a voltage regulator for a synchronous generator, a high voltage supply provides feedback to a generator control. In addition, the high voltage passes through a transformer to supply low voltage. Feedback on the low voltage provides precise control over the low voltage being supplied.

These and other features of the present invention can be best understood from the following specification and drawings, the following of which is a brief description.

DETAILED DESCRIPTION OF THE PREFERRED EMBODIMENT

This disclosure describes a method of combining voltage regulation schemes for both the high voltage and low voltage load applications. The scheme and the topology for synchronous wound field generators are applicable to transportation and aerospace applications, as well as other industries. Three-phase high voltage is regulated conventionally using the exciter field control. But, in addition to this, the high voltage 3-phase voltage is reduced to a low voltage level by using a single phase high frequency transformer. It is then rectified and then sensed and regulated through another voltage regulator.

Figure 1:
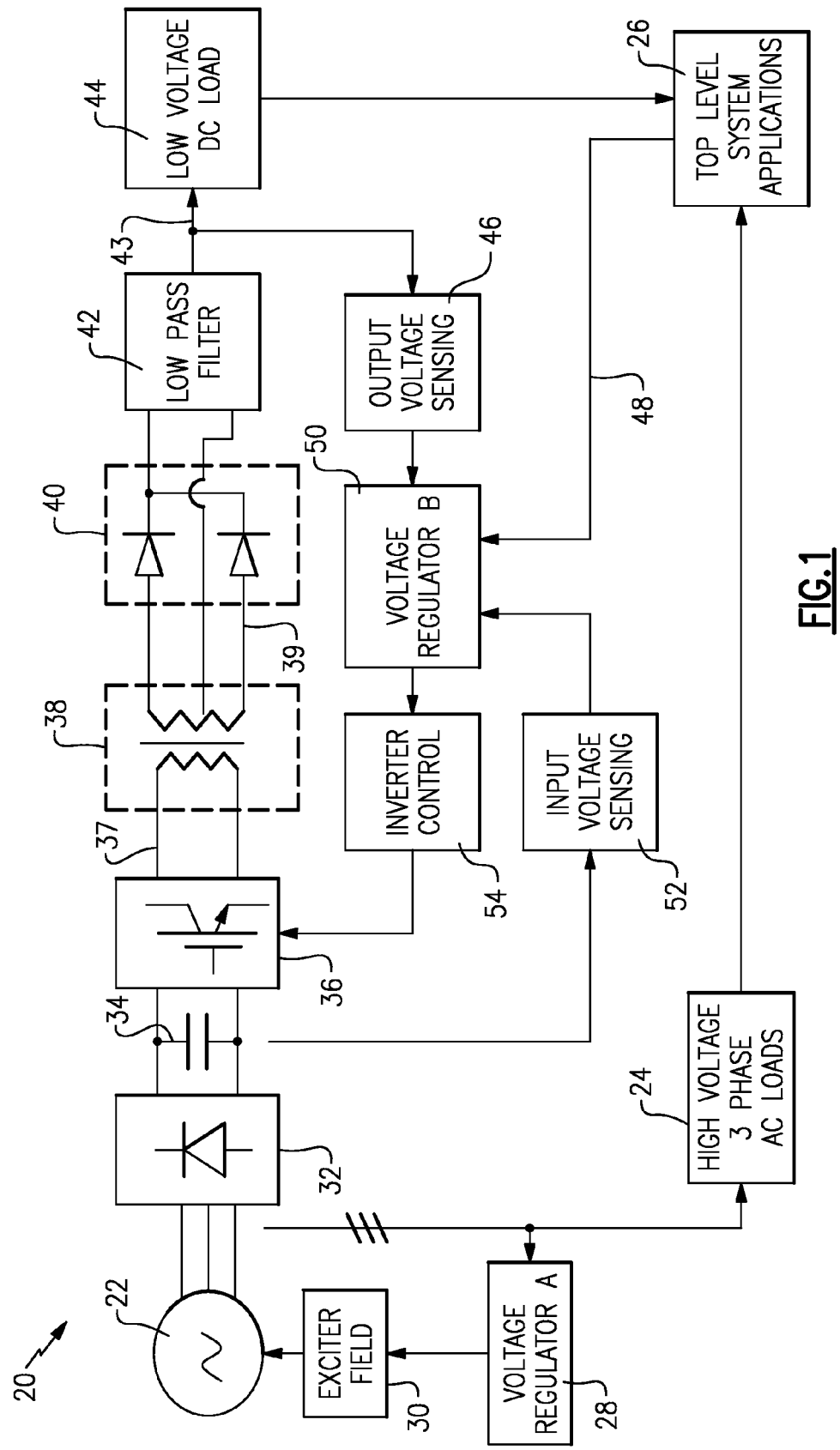
FIG. 1 is a schematic view of a voltage regulator and generator according to the present invention.

A three phase synchronous generator with a multi output voltage regulating system 20 is illustrated in FIG. 1. As shown, the standard high voltage 3-phase output produced by generator 22 is directly connected to high voltage 3-phase load 24. The load 24 can be any type of 3-phase high voltage AC loads.

Like a standard 3-phase synchronous generator, voltage regulator 28 provides feedback and control to the exciter field 30 to adjust the exciter field current to maintain the constant 3-phase high voltage output of the generator 22. The high voltage output is supplied to application 26

The remainder of the circuit shown in FIG. 1 is to provide regulated low DC voltage output at 43 for the DC load 44.

The 3-phase high voltage AC output of the generator 22 is rectified to DC voltage by using an AC/DC rectifier 32. The output of rectifier 32 is then filtered by capacitor 34. This filtered high voltage DC is inverted to 1-phase high frequency AC voltage by using DC/AC inverter 36. The generated high frequency, high voltage AC at 37 is then converted to low DC voltage, by using the high frequency center-tapped transformer 38 and a full wave rectifier 40. Then going thru the low pass filter 42, the desired DC output voltage at line 43 is available for the low voltage DC load 44.

The low voltage DC output at 43 is connected to the voltage regulator 50 thru a voltage sensing system 46. This regulator will receive a command signal 48 from the application(s) 26. Also, the high voltage DC at 34 is sensed by input voltage sensor 52 and connected to the regulator 50. The regulator 50 provides control to the DC/AC inverter 36 thru inverter controller 54. Thus, the input voltage to the high frequency transformer 38 is adjusted, and the final DC output voltage at 43 is maintained at the desired level.

Figure 2A:
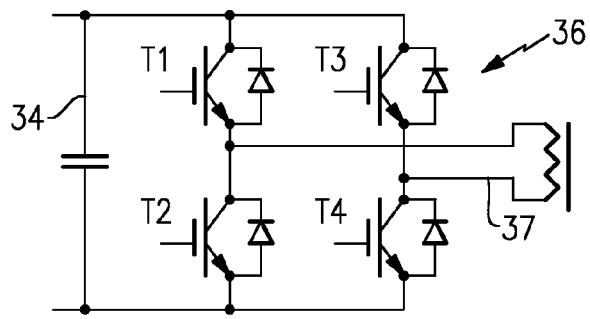
FIG. 2A shows an inverter which is a portion of the FIG. 1 schematic.
Figure 2B:
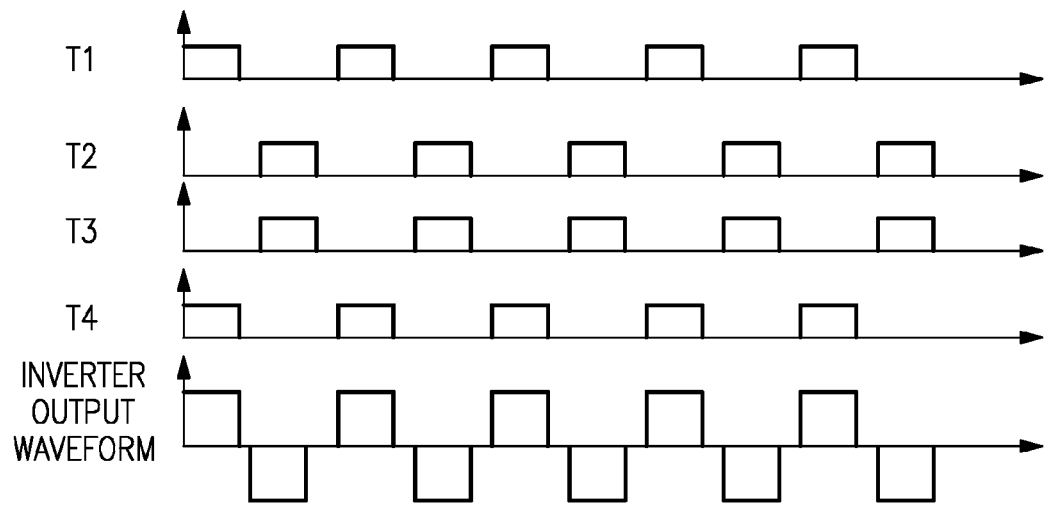
FIG. 2B shows output wave forms from the FIG. 2A inverter.

As shown in FIG. 2A, the inverter 36 may include a plurality of switches T1, T2, T3, and T4. Each of switches T1-T4 is controlled at 54 to produce the outputs shown in FIG. 2B. The output at point 37 leading into transformer 38 is shown in FIG. 2B as the "inverter output wave form."

Figure 3A:
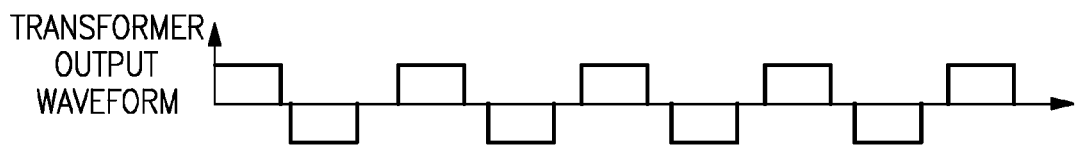
FIG. 3A shows output wave forms at one point.
Figure 3B:
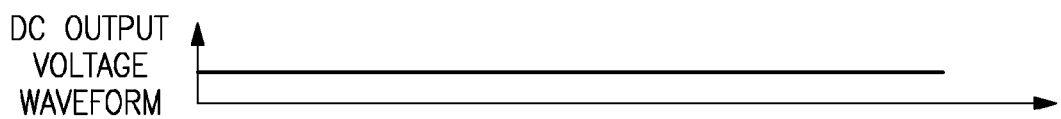
FIG. 3B shows output wave forms at a second point.

The output of the transformer 38 at point 39 is shown in FIG. 3A, and the output at point 43 is shown in FIG. 3B.

With this invention, effective control over both the high voltage and the low voltage being supplied to the use may be maintained.

As disclosed in this application, a single high voltage line leaves the generator and passes to both load 24 and rectifier 32. For purposes of this application, a single high voltage line is claimed, but this should be interpreted to cover any supply from a generator to a high voltage branch and a low voltage branch, be it two distinct lines, or a branched line as shown.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A voltage regulator for a generator comprising:
   a high voltage line to supply three-phase AC power to a high voltage use, and a feedback link from said high voltage line to provide feedback to a control for the generator to achieve a desired voltage on said high voltage line;
   the high voltage line supplying a high voltage to be stepped down to a low voltage;
   a low voltage line receiving the low voltage for connection to a low voltage use; and
   a feedback line for providing feedback from said low voltage line to a low voltage control for controlling the level of voltage supplied on said low voltage line.

2. The voltage regulator as set forth in claim 1, wherein said high voltage supplied to be stepped down passes through a transformer.

3. The voltage regulator as set forth in claim 2, wherein said transformer is positioned upstream of a rectifier.

4. The voltage regulator as set forth in claim 2, wherein the feedback line for said low voltage line supplies a sensed low voltage to a low voltage control and a desired low voltage is also supplied to said low voltage control.

5. The voltage regulator as set forth in claim 3, wherein said low voltage control controls an inverter to ensure a desired low voltage on said low voltage line.

6. The voltage regulator as set forth in claim 5, wherein an input voltage upstream of said inverter is also supplied to said low voltage control to allow said low voltage control to control said inverter and achieve said desired low voltage.

7. The voltage regulator as set forth in claim 5, wherein said inverter includes at least four switches which are controlled to provide desired wave forms to be input into said transformer.

8. A generator, voltage regulator, and use comprising:
   a synchronous generator supplying three phase AC power to a high voltage line;
   a high voltage line to supply the three-phase AC power to a high voltage use, and a feedback link from said high voltage line to provide feedback to a control for the generator to achieve a desired voltage on said high voltage line;
   the high voltage line supplying a high voltage to be stepped down to a low voltage, a low voltage line receiving the low voltage for connection to a low voltage use; and
   a feedback line for providing feedback from said low voltage line to a low voltage control for controlling the level of voltage supplied on said low voltage line.

9. The generator, voltage regulator, and use as set forth in claim 8, wherein said high voltage supplied to be stepped down passes through a transformer.

10. The generator, voltage regulator, and use as set forth in claim 9, wherein said transformer is positioned upstream of a rectifier.

11. The generator, voltage regulator, and use as set forth in claim 9, wherein the feedback line for said low voltage line supplies a sensed low voltage to a control and a desired low voltage is also supplied to said low voltage control.

12. The generator, voltage regulator, and use as set forth in claim 10, wherein said low voltage control controls an inverter to ensure a desired low voltage on said low voltage line.

13. The generator, voltage regulator, and use as set forth in claim 12, wherein an input voltage upstream of said inverter is also supplied to said low voltage control to allow said low voltage control to control said inverter and achieve said desired low voltage.

14. The generator, voltage regulator, and use as set forth in claim 12, wherein said inverter includes at least four switches which are controlled to provide desired wave forms to be input into said transformer.

15. The generator, voltage regulator, and use as set forth in claim 8, wherein said high voltage use is an electric motor and said low voltage use is a control voltage.

16. The voltage regulator as set forth in claim 5, wherein an output of said inverter sends an AC signal into the transformer.

17. The generator, voltage regulator, and use as set forth in claim 12, wherein an output of said inverter sends an AC signal into the transformer.

* * * * *